United States Patent [19]

Atwood et al.

[11] 3,831,367

[45] Aug. 27, 1974

[54] SPINNING AND TWISTING RING CONSTRUCTION

[75] Inventors: Hyatt B. Atwood, Buffalo; James N. McLean, Tonawanda, both of N.Y.

[73] Assignee: Herr Manufacturing Company, Inc., Tonawanda, N.Y.

[22] Filed: Apr. 10, 1972

[21] Appl. No.: 242,691

[52] U.S. Cl. .............................................. 57/120
[51] Int. Cl. ........................................... D01h 7/62
[58] Field of Search ............... 57/119, 120; 138/40; 184/7 H

[56] References Cited
UNITED STATES PATENTS

| | | | |
|---|---|---|---|
| 1,918,644 | 7/1933 | Hofmann | 57/120 |
| 1,999,101 | 4/1935 | Jones | 57/120 |
| 2,132,011 | 10/1938 | Bennett et al. | 138/40 |
| 2,867,076 | 1/1959 | Atwood | 57/120 |
| 2,932,937 | 4/1960 | Atwood | 57/120 |
| 3,071,160 | 12/1963 | Weichbrod | 138/40 |
| 3,081,592 | 3/1963 | Osterman | 57/120 |
| 3,112,603 | 12/1963 | Atwood | 57/120 |
| 3,204,663 | 9/1965 | Taylor | 138/40 |

FOREIGN PATENTS OR APPLICATIONS

| | | | |
|---|---|---|---|
| 996,054 | 6/1965 | Great Britain | 57/120 |

*Primary Examiner*—John W. Huckert
*Assistant Examiner*—Charles Gorenstein
*Attorney, Agent, or Firm*—Joseph P. Gastel

[57] ABSTRACT

A spinning and twisting ring comprising an upper annular portion and a lower annular portion pressed into engagement therewith with an interference fit, first and second contiguous surfaces on said upper and lower annular portions for defining a seam, a bearing surface formed by said first and second annular portions, a lubricant groove formed by adjacent portions of said upper and lower annular portions, and slot means formed in said seam, said slot means having one end in communication with said lubricant groove and the opposite end terminating at said bearing surface for conducting lubricant to said bearing surface, a second bearing surface on said upper annular ring portion, and a plurality of spot lubrication conduits extending between said lubricant groove and said second surface, said spot lubrication conduits each including a bore in said upper annular ring portion, a pin mounted within said bore and retained therein with an interference fit, and a clearance between said pin and said bore for defining a lubricant channel between said lubricant groove and said second bearing surface.

9 Claims, 8 Drawing Figures

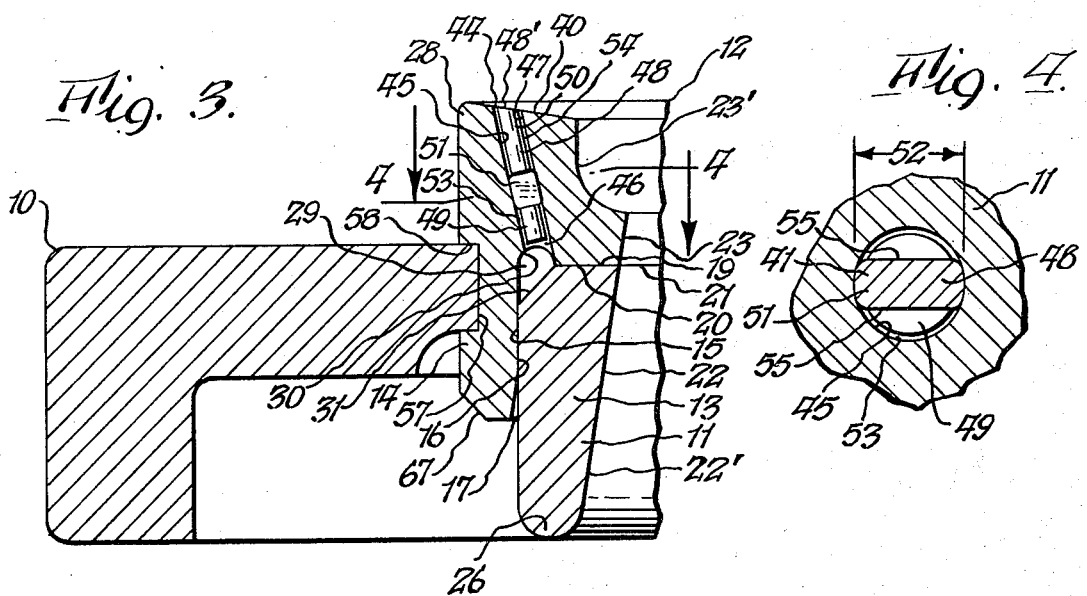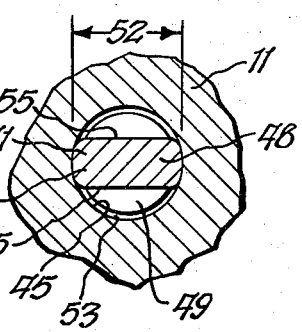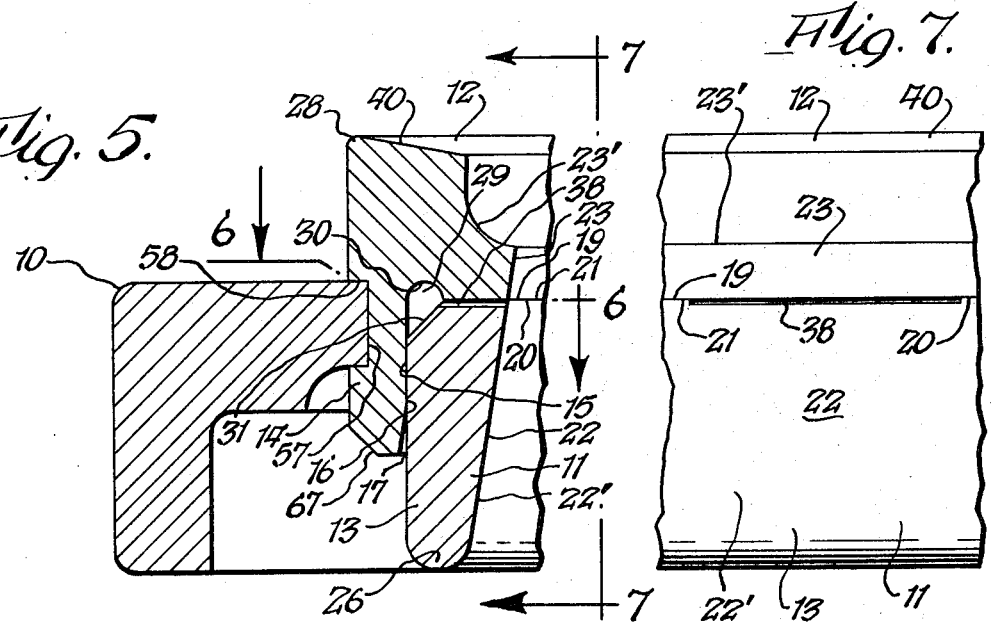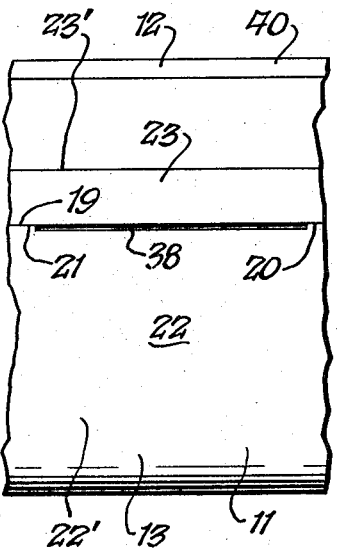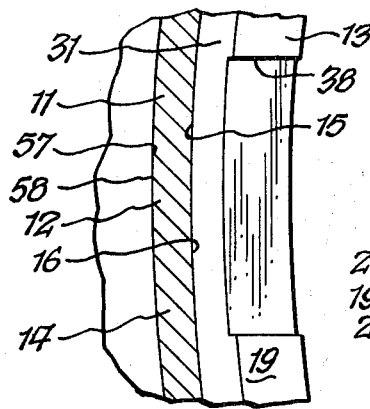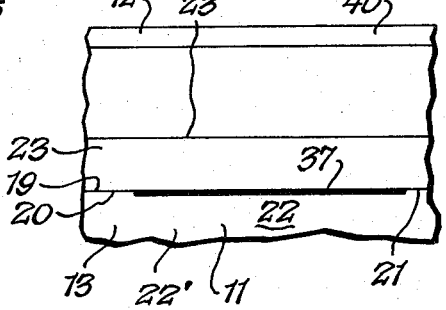

SPINNING AND TWISTING RING CONSTRUCTION

The present invention relates to an improved spinning and twisting ring construction.

It is one object of the present invention to provide a spinning and twisting ring construction having an improved lubrication system which is capable of providing a controlled flow of lubricant to the bearing surfaces thereof.

Another object of the present invention is to provide an improved spinning and twisting ring construction in which standard ring blanks can be customized to provide different lubricating characteristics.

A further object of the present invention is to provide an improved spinning and twisting ring construction which has lubricant slots formed therein as parts of the seams which are formed when portions of the spinning ring are assembled.

Yet another object of the present invention is to provide an improved spinning and twisting ring which includes an unique spot lubrication construction which is simple to fabricate and which is highly reliable in operation.

A further object of the present invention is to provide an improved spinning ring construction consisting of separable upper and lower portions which can be disassembled for purposes of replacement or repair. Other objects and attendant advantages of the present invention will readily be perceived hereafter.

The improved spinning and twisting ring of the present invention comprises first and second annular portions, first and second continguous surfaces on said first and second annular portions for defining a seam when said first and second annular portions are in assembled relationship, a bearing surface formed by said first and second annular portions, a lubricant groove formed by adjacent portions of said first and second annular portions, and slot means formed in said seam, said slot means having one end in communication with said lubricant groove and the opposite end terminating at said bearing surface for conducting lubricant to said bearing surface. The improved spinning ring of the present invention may also include spot lubrication to a second bearing surface, said spot lubrication consisting of conduit means for effecting communication between said lubricant groove and said second bearing surface, said conduit means including a pin secured in a bore with an interference fit which provides a channel for flow of lubricant to said second bearing surface. Since the first and second annular portions are secured to each other only by an interference fit, they can be disassembled for repair or replacement.

The various aspects of the present invention will be more fully understood when the following portions of the specification are read in conjunction with the accompanying drawings wherein:

FIG. 3 is an enlarged fragmentary cross sectional view taken substantially along line 3—3 of FIG. 1 and showing the details of the structure for effecting spot lubrication of the upper bearing surface of the spinning ring;

FIG. 4 is a fragmentary cross sectional view taken substantially along line 4—4 of FIG. 3 and showing further details of construction of the conduit and core for effecting spot lubrication of the upper bearing surface;

FIG. 5 is a fragmentary cross sectional view taken substantially along line 5—5 of FIG. 1 and showing the relationship of the lubricating slot to the seam between the upper and lower ring portions;

FIG. 6 is a fragmentary cross sectional view taken substantially along line 6—6 of FIG. 5;

FIG. 7 is a side elevational view of the slot of FIG. 5 taken substantially in the direction of line 7—7 of FIG. 5; and FIG. 8 is a view taken substantially in the direction of line 8—8 of FIG. 1 and showing the smaller slot which is closer to the lubricant inlet.

Figure 1:
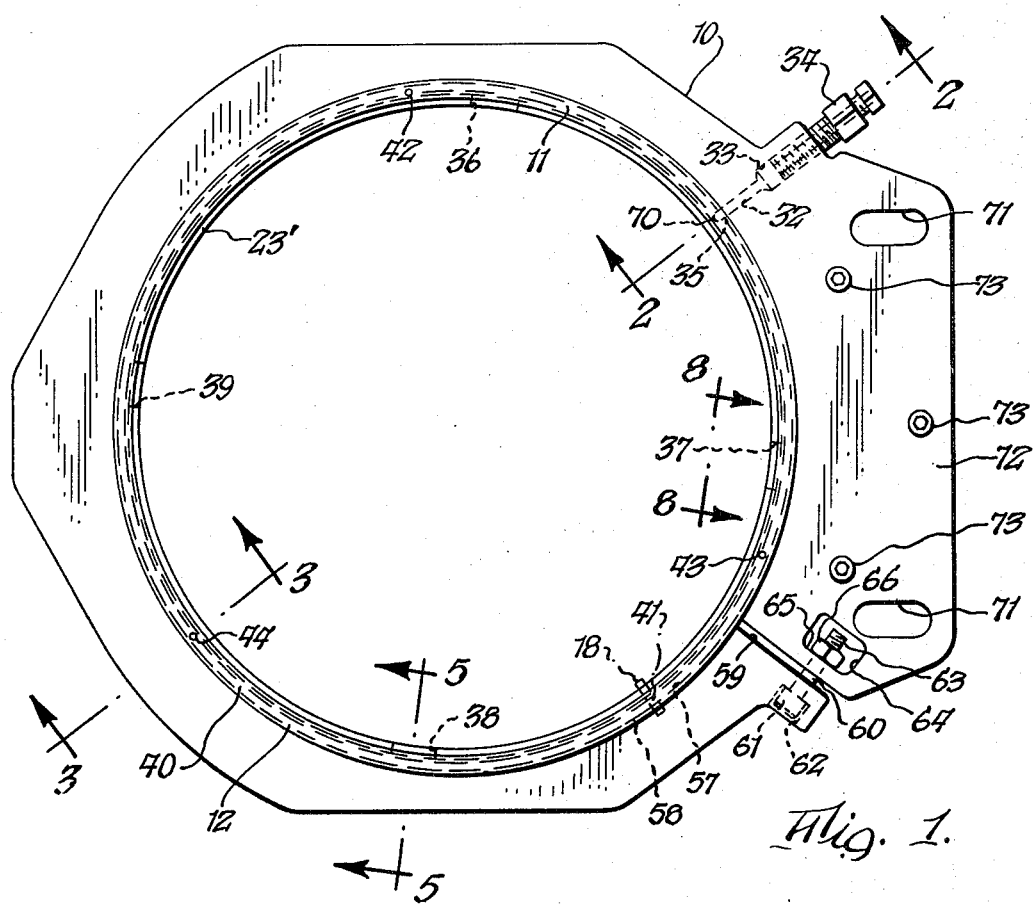
FIG. 1 is a plan view of the improved spinning ring of the present invention mounted in a holder.

The improved structure of the present invention includes a holder 10 mounting an annular spinning and twisting ring 11 (hereafter referred to as a spinning ring) consisting of upper annular ring portion 12 and lower annular ring portion 13 which is pressed into depending annular rim 14 so that cylindrical surface 15 of lower ring portion 13 engages inner cylindrical surface 16 of rim 14 with an interference fit. Suitable sealant is applied at cutaway area 17 to prevent leakage of lubricant through the joint defined by surfaces 15 and 16. Because the ring portions 12 and 13 are connected only by an interference fit, they can be separated for repair or replacement of either part, this having been impossible with prior types of rings which were fabricated of a single piece of material or in which the upper and lower ring portions were welded to each other.

The improved ring 11 of the present invention provides three types of lubrication, namely, seam, slot, and spot lubrication to thereby insure that traveler 18 moves in an optimum manner.

The seam lubrication is obtained as a result of lower ring portion 13 being in its installed position within upper ring portion 12. In this respect upper annular surface 19 of lower ring portion 13 will be in contiguous relationship to annular surface 20 of upper ring portion 12 so as to define a seam 21 therebetween. This seam provides an opening of suitable size to permit lubricant to pass therethrough onto the inner frustoconical bearing surface 22 consisting of surface 22' on the inside of lower ring portion 13 and surface 23 on upper ring portion 12 in alignment with surface 22'. Surface 23 terminates at annular recess portion 23' which provides clearance for a thread carried by traveler 18. The lubricant passing through seam 21 provides lubrication for the shank 24 of traveler 18 which has a foot portion 25 extending around the lower extremity 26 of lower ring portion 13. The top horn 27 of traveler 18 extends around the upper outer portion 28 of upper ring portion 12. The lubricant is supplied to seam 21 from an annular oil groove 29 which is defined by annular surface 30 of upper ring portion 12 and annular chamfered corner 31 of lower ring portion 13. The lubricant is conducted into annular oil groove 29 through bore or conduit 32 in holder 10, bore 32 effecting communication between tapped bore 33 and tube 32' located partially therein and partially in bore 35 in rim 14 of upper ring portion 12. Tube 32' is driven into bore 32 and the annular recess 35', which is produced by peening about the tube 32', is filled with suitable sealant, in accordance with the teaching of U.S. Pat. No.

3,603,070. Suitable lubricant is supplied to fitting 34 by automatic pumping mechanism of conventional construction.

In addition to the seam lubrication described above, slot lubrication is also provided by an unique construction to insure the controlled flow of lubricant to traveler shank 24. In this respect, the upper surface 19 of lower ring portion 13 is milled to provide slots 36, 37, 38 and 39. After the ring portions 12 and 13 are assembled, the slots 36, 37, 38 and 39 function as lubricant conduits. As can best be seen from FIG. 1, slots 36 and 37 are substantially equidistant from lubricant inlet conduit 32. Slots 38 and 39 are also substantially equidistant from lubricant inlet conduit 32. Slots 36 and 37, which are relatively close to lubricant inlet conduit 32, are of lesser depth than slots 38 and 39. Thus, slots 36 and 37 have a smaller effective cross sectional area than slots 38 and 39. In practice, slots 38 and 39 are of a depth of approximately 5/1,000ths of an inch and slots 36 and 37 are of a depth of approximately 3/1,000ths of an inch. The significance of the foregoing is that slots 38 and 39 will provide the same amount of lubrication as slots 36 and 37 notwithstanding that they are further from lubricant inlet conduit 32 than slots 36 and 37 because the larger size of slots 38 and 39 compensates for the lower lubricant pressure at slots 38 and 39 than at slots 36 and 37. In other words, the sizes of the various slots are proportioned to obtain substantially equal lubricant flow, thereby assuring that the inner bearing surface 22 is adequately lubricated at all points for the shank 24 of the traveler. Where desirable seam 21 may be totally closed and in this event the slots would provide the entire lubrication to the inner bearing surface 22.

It can thus be seen that the lubrication slots can be customized for any particular application by varying their cross sectional area, as desired. In addition the number and location of the slots may be varied. All the foregoing can be done by merely milling the desired number and depth of slots onto the lower ring portion 13, as is required for optimum lubrication. This obviates the necessity for different lower ring blanks for different installations.

In addition to the above described seam and slot lubrication, spaced spot lubrication is provided for upper bearing surface 40, above which the head portion 41 of the traveler rides. This spot lubrication is effected at spots or points 42, 43 and 44 in FIG. 1, all of which contain identical structure and therefore the description will be limited only to spot 44. Lubrication at spot 44 is effected through conduit or bore 45 having its lower end 46 in communication with annular lubricant groove 29 and its upper end 47 terminating at upper bearing surface 40. A core or pin member 48 is permanently affixed within bore 45. More specifically, pin 48 includes a lower cylindrical portion 49, an upper cylindrical portion 50, which is of the same diameter as lower portion 49, and a central flattened portion 51 which at dimension 52 is slightly greater than the diameter of bore 45 so that it will engage the inside of bore 45 with an interference fit to keep pin 48 firmly in position. The annular space 53 between lower pin portion 49 and bore 45 and the annular space 54 between upper pin portion 50 and bore 45 are in communication with each other by the clearances 55 on opposite sides of flattened portion 51. Thus lubricant can flow from one end 46 of bore 45 to the other end 47. It will be appreciated that the varying of the dimensions of the annular spaces 53 and 54 will vary the amount of lubrication flow through bore or conduit 45. In practice the diameter of sections 50 and 49 has been 0.036 and the diameter of bore 45 has been 0.044 inches so that the width of the annular ring is 0.004 inches. Obviously by varying the diameter of cylindrical portions 49 and 50 for different installations, the amount of lubricant flow can be controlled. It is to be especially noted that since flattened section 51 is of reasonably long dimension axially of pin 48, that is, in this instance more than one-quarter of the length of pin 48, it will tend to act as an alignment device for properly centering point 48 within bore 45. Top 48' of pin 48 is cut at an angle to lie flush with upper bearing surface 40. It will be appreciated that the amount of clearance between pin 48 and bore 45 may be the same at all the spots 42, 43 and 44 or may be varied, as required, to obtain optimum lubrication. In the event it becomes necessary to clean the lubricant conduits, it is merely necessary to inject compressed air into fitting 34. The dimensions set forth above have been used with a ring having an outer diameter of approximately 7 inches.

Figure 2:
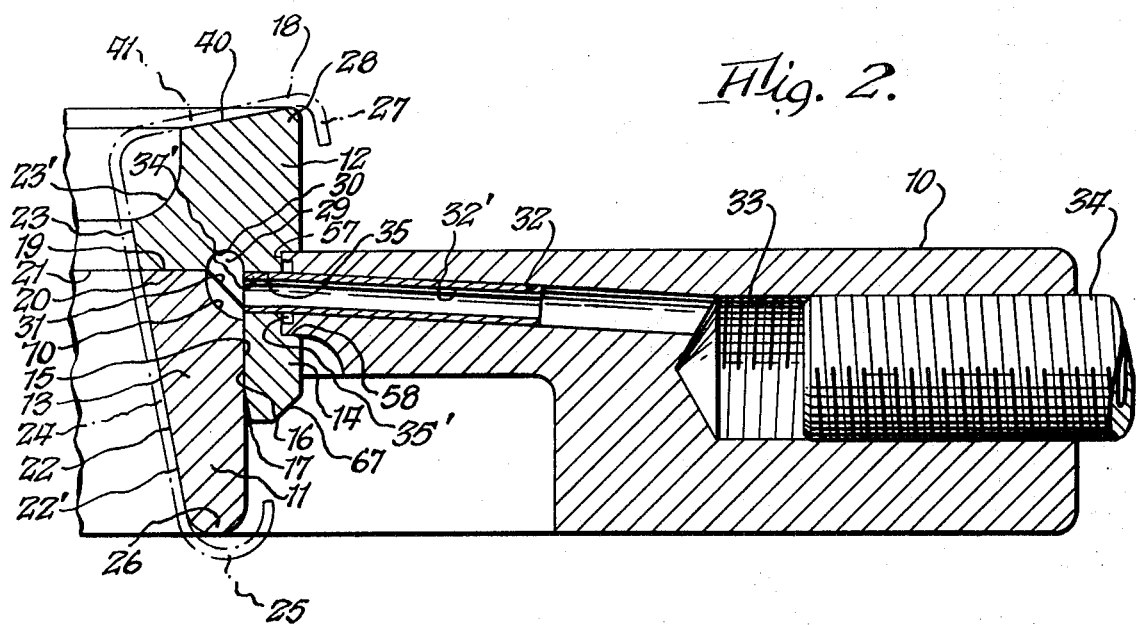
FIG. 2 is an enlarged fragmentary cross sectional view taken substantially along line 2—2 of FIG. 1 and showing the details of construction of the holder and the spinning ring in the area of the lubricant inlet.

The assembled ring 11 is mounted in holder 10 by causing the inner annular peripheral surface 57 of holder 10 to be received in annular groove 58 in the outer side of upper ring portion 11. Holder 10 is a casting which has a continuous annular form except for split 59. The head 61 of bolt 60 is received in recess 62 and the end 63 of bolt 60 is received in recess 64 having a shoulder 65 on which nut 66 bears when the nut and bolt assembly is tightened. Before the nut and bolt are tightened, the holder is slipped upwardly onto upper ring portion 12, and to this end an annular chamfer 67 is provided to act as a cam surface over which holder 10 travels. By suitable cocking during the assembly of ring 11 and holder 10, as described in detail in U.S. Pat. No. 3,603,070, the end 34' of tube 32' is inserted into bore 35, so that the final assembly will be as shown in FIG. 2. Upon tightening of nut 66, holder 10 will clamp onto upper ring portion 12. The ring 11 may be selectively inserted and removed from holder 10, as required.

A notch 70 (FIGS. 1 and 2) is provided in chamfered surface 31. This notch has a circumferential dimension of approximately one-sixteenth of one inch and is used during assembly of the ring portion as a reference point in effecting alignment between bore 35 in upper ring portion 12 and lower ring portion 13 to insure that the slots 36, 37, 38 and 39 are located in their intended positions relative to lubricant inlet bore 35. Furthermore, because the slot has a slight width, any slight misalignment between the upper and lower ring portions will not impede the proper flow of lubricant. Apertures 71 are provided in holder portion 72 for mounting holder 72 on a frame and screws 73 are for leveling the assembled unit.

It can thus be seen that the improved spinning and twisting ring and holder therefor are manifestly capable of achieving the above enumerated objects, and while a preferred embodiment of the present invention has been disclosed, it will be appreciated that it is not limited thereto but may be otherwise embodied within the scope of the following claims.

What is claimed is:

1. A spinning and twisting ring comprising an annular ring having first and second annular ring portions, a lubricant groove in said annular ring, a bearing surface on said annular ring, and conduit means in said first annular ring portion extending between said lubricant groove and said bearing surface, said conduit means including bore means in said first ring portion and pin means in said bore means, said pin means comprising a pin having a first portion for providing effective retaining engagement with said bore means and a second portion for providing a lubricant channel with said bore means to thereby conduct lubricant from said lubricant groove to said bearing surface, and first and second annular contiguous surfaces on said first and second annular portions, respectively, for removably securing said first and second annular ring portions to each other with an interference fit, said lubricant groove being formed by adjacent surfaces of said first and second annular ring portions.

2. A spinning and twisting ring as set forth in claim 1 including a plurality of said conduit means spaced circumferentially on said ring.

3. A spinning and twisting ring as set forth in claim 1 wherein said ring includes an upper annular bearing surface, and wherein said conduit means extend between said lubricant groove and said upper annular bearing surface.

4. A spinning and twisting ring comprising first and second annular ring portions, first and second contiguous surfaces on said first and second annular portions for defining a seam, a bearing surface formed by said first and second annular portions, a lubricant groove formed by adjacent portions of said first and second annular portions, slot means formed in said seam, said slot means having one end in communication with said lubricant groove and the opposite end terminating at said bearing surface for conducting lubricant to said bearing surface, said slot means comprising a plurality of slots spaced circumferentially about said ring, and a lubricant inlet conduit in said ring, said slots including a first slot which is nearer to said inlet conduit and a second slot which is further from said inlet conduit, with said second slot being of greater effective cross sectional area than said first slot to thereby cause lubricant flow from said slots to be in a predetermined proportion.

5. A spinning and twisting ring as set forth in claim 4 wherein said first and second slots are of unequal effective cross sectional area and are dimensioned to cause the lubricant flow therefrom to be substantially equal.

6. A spinning and twisting ring comprising first and second annular ring portions, first and second contiguous surfaces on said first and second annular portions for defining a seam, a bearing surface formed by said first and second annular portions, a lubricant groove formed by adjacent portions of said first and second annular portions, slot means formed in said seam, said slot means having one end in communication with said lubricant groove and the opposite end terminating at said bearing surface for conducting lubricant to said bearing surface, a second bearing surface on said first annular portion, conduit means in said first annular portion extending between said lubricant groove and said second bearing surface for effecting communication between said lubricant groove and said second bearing surface, said first annular portion comprising an upper annular portion, said second annular portion comprising a lower annular portion, said bearing surface comprising an inner bearing surface, said second bearing surface comprising an upper bearing surface, said conduit means including a bore, pin means in said bore, said pin means including a portion in retaining engagement with said bore and a portion for defining said conduit means with said bore, a plurality of said conduit means being located circumferentially on said upper bearing surface, said pin means including first and second portions for defining first and second channels with said bore, said pin means also including an enlarged portion between said first and second portions for engagement with said bore by an interference fit, and said enlarged portion being located proximate a clearance portion on said pin means for effecting communication between said first and second channels.

7. A spinning and twisting ring comprising an annular ring, a lubricant groove in said annular ring, a bearing surface on said annular ring, a conduit means extending between said lubricant groove and said bearing surface, said conduit means including a bore in said ring and pin means in said bore, said pin means comprising a pin having a first portion for providing effective retaining engagement with said bore and a second portion for providing a lubricant channel with said bore to thereby conduct lubricant from said lubricant groove to said bearing surface, said second portion of said pin means comprising first and second sections for defining first and second channels with said bore, said first portion of said pin means including an enlarged portion between said first and second sections for engagement with said bore by an interference fit, and said enlarged portion being located proximate a clearance portion on said pin means for effecting communication between said first and second channels.

8. A spinning and twisting ring comprising first and second annular ring portions, first and second contiguous surfaces on said first and second annular portions for defining a seam, a bearing surface formed by said first and second annular portions, a lubricant groove formed by adjacent portions of said first and second annular portions, slot means formed in said seam, said slot means having one end in communication with said lubricant groove and the opposite end terminating at said bearing surface for conducting lubricant to said bearing surface, third and fourth annular contiguous surfaces on said first and second annular portions, respectively, for removably securing said first and second annular ring portions to each other with an interference fit, a second bearing surface on said first annular portion, conduit means in said first annular portion extending between said lubricant groove and said second bearing surface for effecting communication between said lubricant groove and said second bearing surface, said first annular portion comprising an upper annular portion, said second annular portion comprising a lower annular portion, said bearing surface comprising an inner bearing surface, said second bearing surface comprising an upper bearing surface, said conduit means including bore means, pin means in said bore means, and said pin means including a portion in retaining engagement with said bore means and a portion for defining said conduit means with said bore means.

9. A spinning and twisting ring as set forth in claim 8 wherein a plurality of said conduit means are located circumferentially on said upper bearing surface.

* * * * *